3,338,685
PENTAFLUOROSULFUR BROMIDE
Claude I. Merrill, 1718 Montrose St.,
Midland, Mich. 48640
No Drawing. Filed Sept. 7, 1962, Ser. No. 222,175
2 Claims. (Cl. 23—367)

This invention relates to a new and novel inorganic fluorine containing sulfur compound and more particularly is concerned with the new compound pentafluorosulfur bromide corresponding to the empirical formula $SF_5Br$.

This compound is suitable for use as a source material for introducing the pentafluorosulfur group ($SF_5$—) into organic molecules. It also can be used as an oxidizing agent. Further, it has been shown to be effective as a gaseous insecticide.

Pentafluorosulfur bromide is prepared by reacting sulfur tetrafluoride, bromine and bromine pentafluoride in a sealed reaction vessel over a temperature range of from about 50 to about 180 degrees centigrade. Ordinarily, the reaction is carried out in a pressure resistant reactor at a temperature of from about 100 to about 150 degrees centigrade. With temperatures above about 150° centigrade usually an excess of bromine is used as a diluent to avoid detrimental degradation of the product.

The ratio of sulfur tetrafluoride ($SF_4$) to bromine pentafluoride ($BrF_5$) to be employed ranges from about 0.1 to about 10 on a gram mole basis. The minimum amount of bromine used is that quantity substantially equal on a gram mole basis to the amount of bromine pentafluoride present in the reaction mixture. The upper concentration of bromine to be used is not critical except that it be kept below a value wherein there is excessive dilution of the other reactants in a given reactor. Ordinarily, the $Br_2/BrF_5$ gram mole mole ratio for a given reaction mixture will not exceed 10. Preferably at temperatures below about 150° C. about stoichiometric gram molar qauntities of the reactants corresponding to the following equation are used in preparing the compound.

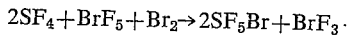

$$2SF_4 + BrF_5 + Br_2 \rightarrow 2SF_5Br + BrF_3.$$

The reaction is usually carried out in a sealed, pressurizable reactor at the autogenous pressure generated by the reaction mixture at the predetermined reaction temperature. Reaction times of from less than an hour to several days or more have been found to be satisfactory. The actual time of reaction to be used varies in an inverse manner with the temperature at which the compound preparation is carried out. At the higher temperatures, within the range set forth hereinbefore, shorter reaction times are employed and at the lower reaction temperatures longer periods are used.

In carrying out the preparation of the pentafluorosulfur bromide, sulfur tetrafluoride, bromine and bromine pentafluoride reactants are introduced either separately into a reactor or are premixed in predetermined proportions and introduced as a mixture into the reaction vessel. In any event, the reactants readily are handled by conventional handling and material transfer techniques and apparatus such as vacuum or reduced pressure transfer lines and the like, for example. The reactor is sealed and the reactor and contents heated to the desired reaction temperature and maintained at this temperature for a predetermined period of time. Following the reaction period, the product mixture is removed from the reactor. This mixture can be collected and stored in a gas storage reservoir or if desired can be condensed and collected in a cold trap and later separated to recover the pentafluorosulfur bromide. Alternatively, the product mixture can be separated directly as removed from the reactor by fractional codistillation, fractional distillation, vapor phase chromatographic techniques and the like to recover the pentafluorosulfur bromide.

Reactors and material handling equipment used in the preparation of the compound must possess the structural characteristics to withstand the pressures generated during the reaction and must not be detrimentally or corrosively attacked by the reactants or products of the reaction. Nickel, nickel alloys, ferrous metals, steel, stainless steel, nickel-lined, nickel alloy-lined and stainless steel lined processing equipment, for example are suitable for use in the present preparation.

The preparation of the compound can be carried out on a batch type, continuous or other type operation as known to one skilled in the art.

The production of pentafluorosulfur bromide is exemplified further by the following example but is not meant to be limited thereto.

*Example*

About 4.2 grams sulfur tetrafluoride (~0.04 gram mole), about 3.1 grams bromine (~0.02 gram mole) and about 1.6 grams bromine pentafluoride (~0.01 gram mole) were transferred by vacuum technique into a tubular Monel nickel alloy reactor having an internal volume of about 5 cubic centimeters. The reactor was sealed and immersed in a steam bath maintained at about 100° C. The tubular reactor and contents were kept in this bath for about 5 days. After this time, the reactor was removed from the steam bath and the product mixture recovered. The products were separated by fractional codistillation. The new compound pentafluorosulfur bromide was obtained in about a 39 percent yield based on the bromine pentafluoride reactant charged. Unreacted sulfur tetrafluoride, unreacted bromine and bromine trifluoride also were found in the product mixture.

The new compound pentafluorosulfur bromide upon characterization was found to have the following properties:

(a) Molecular weight: Experimental, 207.2; theoretical, 207.
(b) Melting point: −78.8 to −78.4° C.
(c) Boiling point: 3.1° C. at 1 atmosphere.
(d) Density: 2.098 grams/cc. at 20.1° C., 2.165 grams/cc. at 3.1° C.
(e) Elemental analysis: Sulfur, 16.7% experimental; 15.5% theoretical. Bromine, 37.5% experimental; 38.6% theoretical.
(f) Infrared spectrum: Infrared analysis showed very strong bands at 892 cm.$^{-1}$ (11.22$\mu$) and 847 cm.$^{-1}$ (11.80$\mu$) as well as a moderately strong band at 690 cm.$^{-1}$ (14.49$\mu$).
(g) Nuclear magnetic resonance spectrum: Under high resolution at 40 mc. the NMR spectrum consisted of two groups of peaks. One group was a doublet, not further resolved by the apparatus used, which was located 88.2 parts per million to a lower field from sulfur hexafluoride. The other group was resolved into nine peaks removed 5 parts per million to a lower field from sulfur hexafluoride. Computer calculation showed this spectrum corresponded to an $AB_4$ system of nuclei which system is in accordance with that expected for pentafluorosulfur bromide.

The compound exhibited a coupling constant of 143 cycles per second and a chemical shift of 3326 cycles per second.

(h) Mass spectrum: The mass spectrum corresponded to the molecular weight of 207 and was consistent with the structure.

A second run was made wherein all reaction conditions and reactant concentrations were the same as for the preparation described directly hereinbefore except that the reaction time was reduced to about 24 hours. The product mixture was separated into its components. This run gave pentafluorosulfur bromide in about the same yield as shown for the previously described run.

In a manner similar to that described for the preceding example, a reaction mixture consisting of sulfur tetrafluoride, bromine and bromine pentafluoride at a $SF_4/BrF_5$ gram mole ratio of about 0.1 and a $Br_2/BrF_5$ gram mole ratio of about 1 can be reacted for about 24 hours at a temperature of about 50° C. to give the desired pentafluorosulfur bromide.

Also, a reaction mixture having a $SF_4/BrF_5$ gram mole ratio of about 10 and a $Br_2/BrF_4$ gram mole ratio of about 10 can be reacted at a temperature of about 180° for about one quarter hour and the desired pentafluorosulfur bromide recovered from the resulting product mixture.

The utility of the new compound of the present invention is demonstrated as follows:

A few millimeters pressure of pentafluorosulfur bromide were introduced into a one liter flask filled with air at normal atmospheric pressure and which contained two live house flies. Within about one minute following the introduction of the pentafluorosulfur bromide into the flask, the flies were dead.

A slight molar excess of ethylene was added to a gaseous sample of pentafluorosulfur bromide contained in a 300 milliliter glass bulb and the bulb sealed. The reaction mixture was allowed to react at room temperature (about 25° C.) for about 10 hours. Following this the product mixture was removed from the vessel and purified by gas chromatographic techniques. This mixture was found to consist of a small amount of ethylene with the remainder being characterized as the compound, 1-pentafluorosulfur-2-bromoethane.

Gaseous pentafluorosulfur bromide was introduced into a reaction vessel containing potassium iodide. An immediate reaction occurred and free iodine was evolved.

I claim:
1. A process for preparing pentafluorosulfur bromide which comprises:
 (a) contacting a reaction mixture of sulfur tetrafluoride, bromine and bromine pentafluoride in a sealed reactor maintained at a temperature of from about 50 to about 180° centigrade, said reaction mixture having a sulfur tetrafluoride/bromine pentafluoride gram mole ratio of from about 0.1 to about 10 and a bromine/bromine pentafluoride gram mole ratio of from about 1 to about 10, and,
 (b) recovering pentafluorosulfur bromide therefrom.
2. A process for preparing pentafluorosulfur bromide which comprises:
 (a) contacting a reaction mixture of sulfur tetrafluoride, bromine and bromine pentafluoride in a sealed reactor maintained at a temperature of about 100° C., said reaction mixture having a sulfur tetrafluoride/bromine pentafluoride gram mole ratio of about 4 and a bromine/bromine pentafluoride gram mole ratio of about 2,
 (b) removing the reaction product mixture from said reactor, and,
 (c) fractionally codistilling said reaction product mixture to recover said pentafluorosulfur bromide therefrom.

References Cited
UNITED STATES PATENTS 3,035,890  5/1962  Roberts _____ 23—14
3,035,893  5/1962  Roberts _____ 23—14

OTHER REFERENCES

Inorganic Chemistry, vol. 1, No. 2, May 1962, pp. 215–219.

OSCAR R. VERTIZ, *Primary Examiner.*

EDWARD STERN, *Examiner.*